PULSE AMPLITUDE COMPRESSION SYSTEM

Filed Nov. 10, 1959 3 Sheets-Sheet 1

INVENTOR.
CARVER L. WASHBURN
BY Charles Baraff
AGENT

April 21, 1964 C. L. WASHBURN 3,130,400

PULSE AMPLITUDE COMPRESSION SYSTEM

Filed Nov. 10, 1959 3 Sheets-Sheet 2

INVENTOR.
CARVER L. WASHBURN

BY Charles Baraff
AGENT

INVENTOR.
CARVER L. WASHBURN
BY Charles Baraff
AGENT

United States Patent Office 3,130,400
Patented Apr. 21, 1964

3,130,400
PULSE AMPLITUDE COMPRESSION SYSTEM

Carver L. Washburn, Wayne, N.J., assignor to International Telephone and Telegraph Corporation, Nutley, N.J., a corporation of Maryland
Filed Nov. 10, 1959, Ser. No. 852,148
7 Claims. (Cl. 340—347)

This invention relates to signal amplitude control systems, and more particularly to automatic gain control systems which may be used for compressing or expanding pulse signal amplitudes.

In the reception of pulsed microwave signals and the like, a large dynamic range of signal amplitudes is encountered. The subsequent transformation of the microwave signals to video pulses also provides a large dynamic amplitude range for the video pulses.

Certain reconnaissance systems, having the primary function of pulse analysis, are unable to handle a large dynamic range of pulse signals because of inherent limitations.

Accordingly, it is an object of the present invention to compress a large dynamic amplitude range of pulse signals in a linear manner into a smaller range of amplitudes.

A feature of the invention is a selector matrix for converting pulses of a wide, dynamic amplitude range into pulses of a compressed amplitude range.

Another feature of the invention is a pulse amplitude compression system wherein a selector matrix is controlled by a step attenuator, and a digital code translator for the input pulse amplitudes, to yield pulses of narrower amplitude range in the output of the system.

The above-mentioned and other features and objects of this invention will become more apparent by reference to the following description of an embodiment thereof taken in conjunction with the drawings, in which.

Figures 1, 3, 4A:
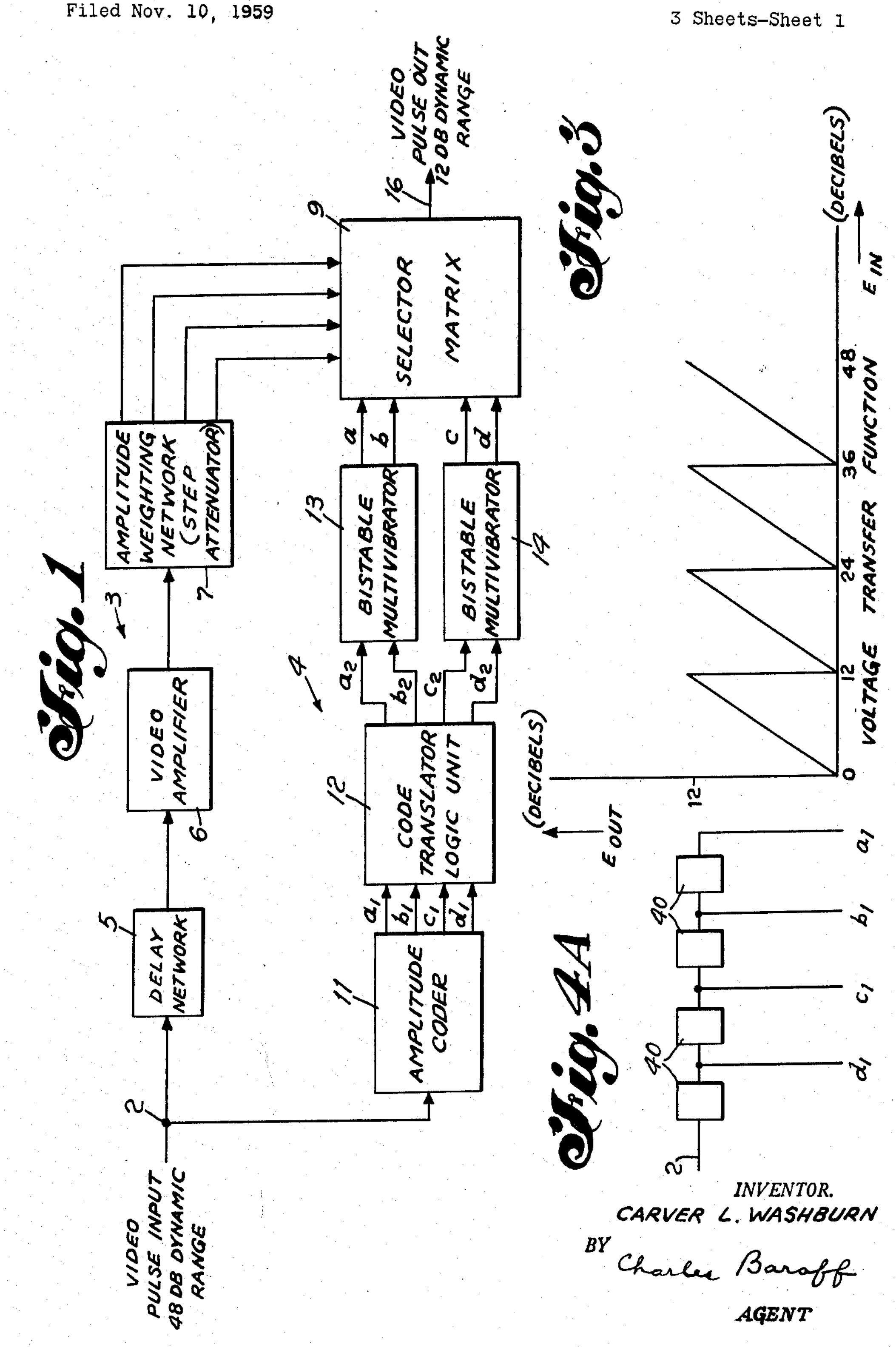
FIG. 1 is a block diagram of the automatic gain reduction system for a wide dynamic range of pulses.
FIG. 3 is a graph showing the transfer function for the system of FIG. 1.
FIGS. 4, 4A, 4B are block diagrams of the amplitude coder of FIG. 1.

Referring to FIG. 1, an automatic gain reduction system 1 is shown, to which video pulses, for example, radar pulses or the like may be applied at its input terminal 2. The various pulse signals which are applied to input terminal 2 have amplitudes, which fall into a wide dynamic range, for example, a 48 db range. Two parallel paths 3, 4 for the incoming pulse signals are provided. In the first path 3, the pulse signals are delayed (for reasons explained hereinafter), for example, by 2 $\mu$s., in a delay network 5, and amplified in a video amplifier 6, which amplifies the pulses to a suitable level, and whence they are applied to an amplitude weighting network 7 comprising a step attenuator. The step attenuator 7 in its simplest form may be a resistor with four tapped outputs A, B, C, D as shown in FIG. 2.

Hence, the output of the amplitude weighting network 7 provides four inputs to the selector diode matrix 9 with 0, 12, 24, and 36 db attenuation respectively.

The pulse signals at terminal 2 are also applied to the second path 4 or control channel, wherein the amplitude coder 11 codes the pulse amplitude information into four digital groups; 0–12, 12–24, 24–36, 36–48 db respectively.

Figures 2, 4B:
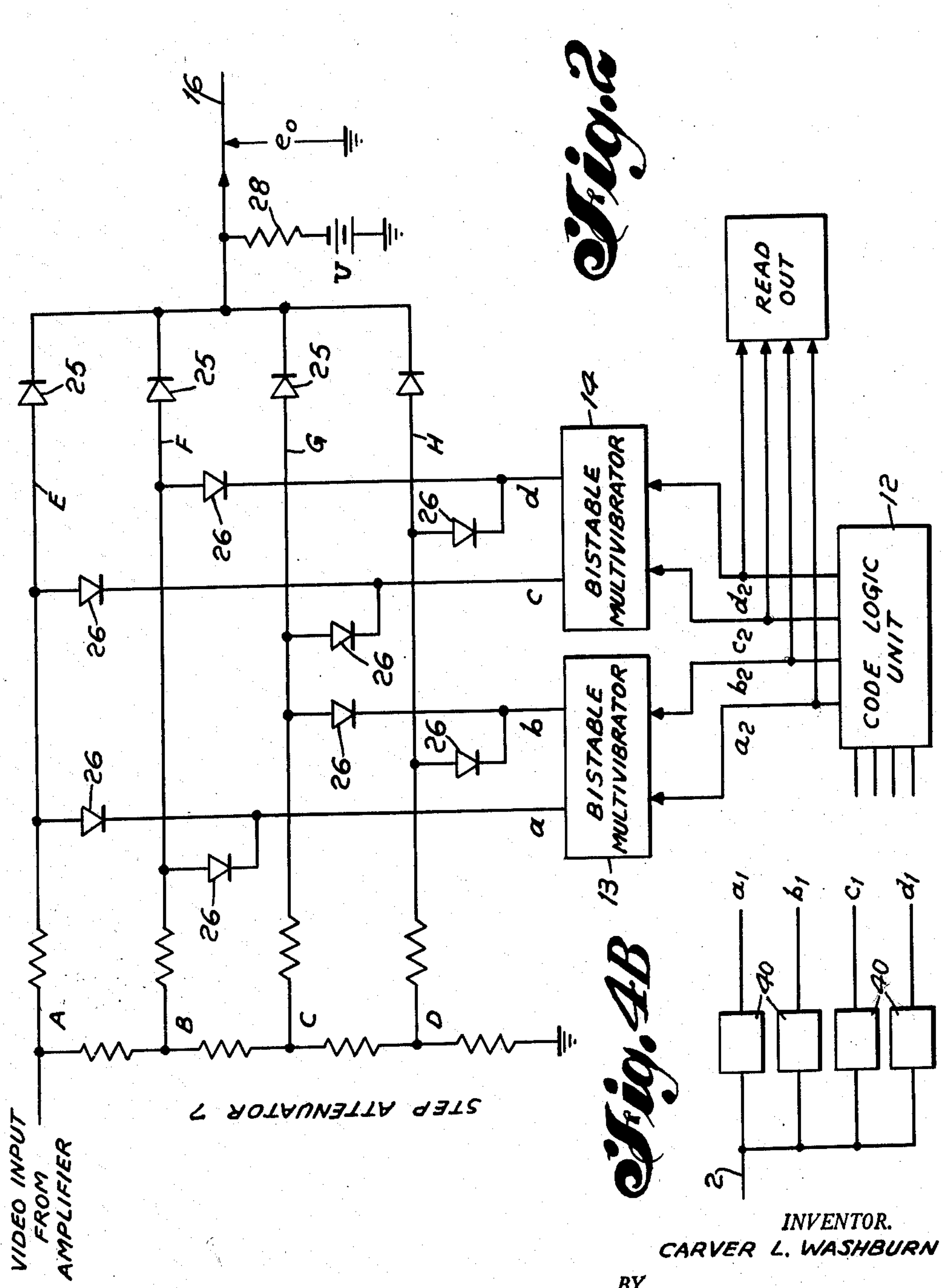
FIG. 2 shows the circuit configuration of the selector matrix of FIG. 1 in association with the logic unit, the bistable multivibrators and the amplitude weighting network 7, which provide coded representations of the pulse amplitudes.

A suitable amplitude comparator circuit 40, four of which are arranged as in FIGS. 4A or 4B for this coding, is disclosed in the U.S. patent application, Serial No. 754,688, filed August 12, 1958, by R. P. Hollis, now Patent No. 2,996,675, or a transistorized version shown in FIG. 4 may also be utilized. Four units of the type shown in FIG. 4 or in said R. P. Hollis application, Serial No. 754,688, filed August 12, 1958, either in series or in parallel, are utilized as the coder 11. The amplitude coder 11 digitizes the signal pulse amplitudes, realizing the following code relationship:

| | Lead | | | |
|---|---|---|---|---|
| | $a_1$ | $b_1$ | $c_1$ | $d_1$ |
| 0–12 db | 0 | 0 | 0 | 1 |
| 12–24 db | 0 | 0 | 1 | 1 |
| 24–36 db | 0 | 1 | 1 | 1 |
| 36–48 db | 1 | 1 | 1 | 1 |

The logic unit 12 translates the above code as follows:

| Leads Input | | | | Leads Out | | | |
|---|---|---|---|---|---|---|---|
| $a_1$ | $b_1$ | $c_1$ | $d_1$ | $a_2$ | $b_2$ | $c_2$ | $d_2$ |
| 0 | 0 | 0 | 1 | 1 | 0 | 1 | 0 |
| 0 | 0 | 1 | 1 | 1 | 0 | 0 | 1 |
| 0 | 1 | 1 | 1 | 0 | 1 | 1 | 0 |
| 1 | 1 | 1 | 1 | 0 | 1 | 0 | 1 |

The translated code at the output is compatible with the operaing conditions for the bistable multivibrators 13, 14, which program the selector matrix 9. All these translations are performed on a pulse-to-pulse basis, that is, the code output of the logic unit 12 varies with and corresponds to the amplitude of each input pulse appearing at point 2 of FIG. 1. The delay in delay network 5 is sufficient to allow enough time for the selector matrix 9 to be programmed or set, before the output pulse from step attenuator 7 is applied to the selector matrix 9.

As indicated previously, the code translator 12 forming the logic unit serves to transform the digital code for pulse amplitudes into a code suitable for operating a pair of conventional bistable multivibrators 13, 14. The bistable multivibrators are D.C. coupled to a diode selector matrix 9, shown more fully in FIG. 2, which selects one of four matrix lines E, F, G, H as the output line. The diodes 25 serve to isolate lines E, F, G, H against interaction, as well as to further attenuate the three unselected lines of the matrix 9.

The diode matrix 9 operates by making certain diodes conduct while all others are non-conducting. Voltages at A, B, C, D remain essentially constant. The diodes 26 of the matrix are arranged to provide the desired selection of an output line.

Voltages at *a*, *b*, *c*, *d* assume one of two possible voltage levels, which are functions of the code operating the bistable multivibrators 13, 14.

If voltages at *a*, *b*, *c* or *d* are more negative than at A, B, C, D the respective diode connecting at *a*, *b*, *c* or *d* line to an A, B, C, D line will conduct. If the voltage at *a*, *b*, *c* or *d* is more positive than at A, B, C or D, then any respective diode connecting an *a*, *b*, *c* or *d* line to an A, B, C or D line will not conduct.

The diodes are so connected that only one line at any time will have the diodes mentioned above in non-conducting condition.

*Example*

Consider a relatively positive voltage as "1" and a relatively negative voltage as "0," if $$a=1 \quad c=1$$
$$b=0 \quad d=0$$

then there will be an output at "E" since the diodes connecting E—*a* and E—*c* are non-conducting. Diodes F—*d*, G—*b*, H—*b*, H—*d* are conducting, shorting output lines F, G, H.

The battery V is a biasing battery for the quiescent states or levels of the matrix diodes 26 and resistance 28 is a load resistor.

The gain reduction action can be readily shown by examining an input pulse amplitude in the range of 12 to 24 db as a typical example. The amplitude range on the respective step attenuator 7 outputs will be (FIG. 2), A, 12 to 24 db
B, 0 to 12 db
C, —12 to 0 db
D, —24 to —12 db The logic unit 12 provides an output code, which will be for this example:

$$a_2=1 \quad c_2=0$$
$$b_2=0 \quad d_2=1$$

This logic unit code causes the video signal on line B to appear across load resistor 28. Since the signal on line B is within an amplitude range of 0–12 db, the gain compression properties have been satisfied. In a similar manner, the signal on the remaining lines (A, C and D for this example) appear across resistor 28 when and only when the respective line is within a 0–12 db amplitude range.

Thus, as shown in FIG. 1, a series of output video pulses having a dynamic range of 12 db will appear on the output line 16, thereby providing a compression in amplitude range of the incoming pulses at terminal 2, which had originally a 48 db dynamic range.

Individual successive pulses, for example, radar pulses or the like, which actuate the logic unit 12, the multivibrators 13, 14 and hence the selector matrix 9, each have the sole control over at what time and to what gain setting the selector matrix follows. The "gain set" period is not limited in the automatic gain reduction system 1 by coupling time constants. Since the logic unit 12 directly controls the bistable multivibrators 13, 14, the proper matrix line of the selector 9 is always selected to hold the output 16 to a maximum dynamic range of 12 db for the case at hand.

The amplitude control provided by the system 1 provides excellent transfer linearity as evidenced by the transfer function of the system, illustrated in FIG. 3.

The diode resistance (forward and reverse) and the multivibrator output amplitudes have no effect on the pedestal balance because the load resistance 28 is very high with respect to the forward resistance of diode 25 of the selected line. The pedestal balance and its long term stability depend solely upon the D.C. voltages present at the step attenuator's outputs A, B, C, D.

The system disclosed herein may also be utilized for the automatic amplitude compression in cathode ray tubes, oscilloscope display devices or the like. It is also adaptable for the various pulse transmission systems of intelligence signals.

Figure 4:
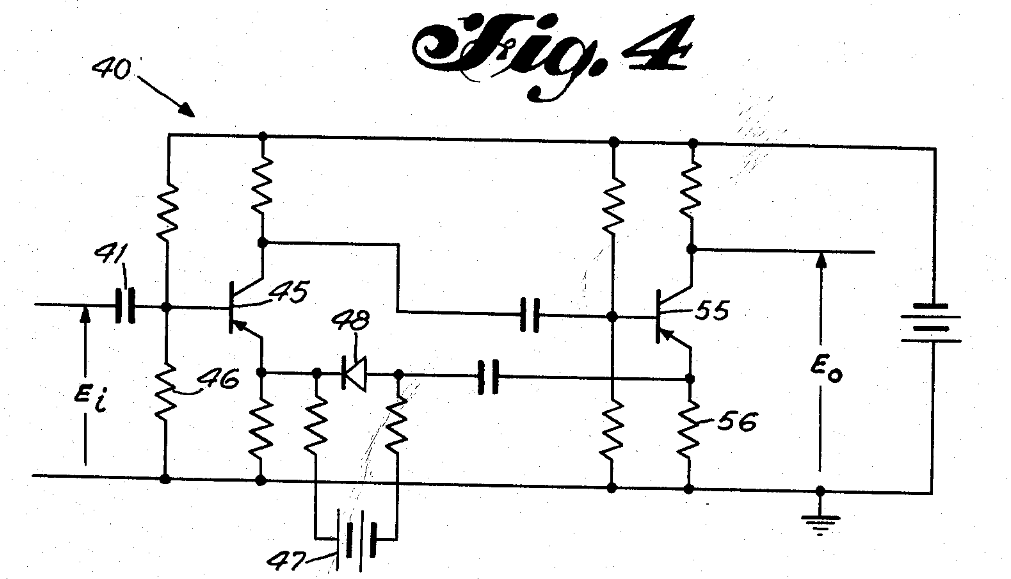

The amplitude coder 11 may consist of four of the transistorized comparator circuits 40 shown in FIG. 4. A negative input signal $E_i$ is applied through capacitor 41 to transistor 45. Transistors 45 and 55 amplify the signal $E_i$ and provide the output $E_o$. The amplifier has gain close to unity due to negative feedback caused by resistors 46 and 56. Capacitor 50 and diode 48 constitute a positive feedback loop when diode 48 conducts. Diode 48 is back biased by battery 47 in the steady state condition.

Hence, when the input signal $E_1$ reaches a predetermined level which is set by battery 47, regeneration occurs providing a large amplitude output pulse, $E_o$. The regenerated output pulse is of sufficient amplitude to actuate the code translator 12 and the bistable multivibrators 13, 14 whereas the non-regenerated output is ineffective. With four of these units, for example, four discrete amplitude levels can be coded. As indicated previously, they may be operated in a series or parallel configuration as disclosed in FIGS. 4A and 4B.

In the parallel configuration of amplitude comparators, shown in FIG. 4B the outputs *a, b, c, d* constitute the individual compartor outputs. The regeneration of the individual comparators is controlled by the bias on a diode 47 as in FIG. 4. In the example described throughout, the comparators 40 regenerate at four signal levels of 0, 12, 24, 36 db respectively, realizing the desired outputs, *a, b, c, d*.

In a series arrangement shown in FIG. 4A, for the coder 11, the four outputs *a, b, c, d*, are provided by tapping the output of each of the amplitude comparators 40 of which the example shows four. As the input pulse amplitude is increased, the amplitude comparators 40 regenerate sequentially starting with the end comparator.

Regardless of whether the amplitude comparators 40 regenerate or operate as a straight amplifier prior to regeneration, the signal is propagated to successive comparators in the series chain. It is obvious that if a comparator regenerates, all succeeding comparators must also regenerate.

Figure 5:
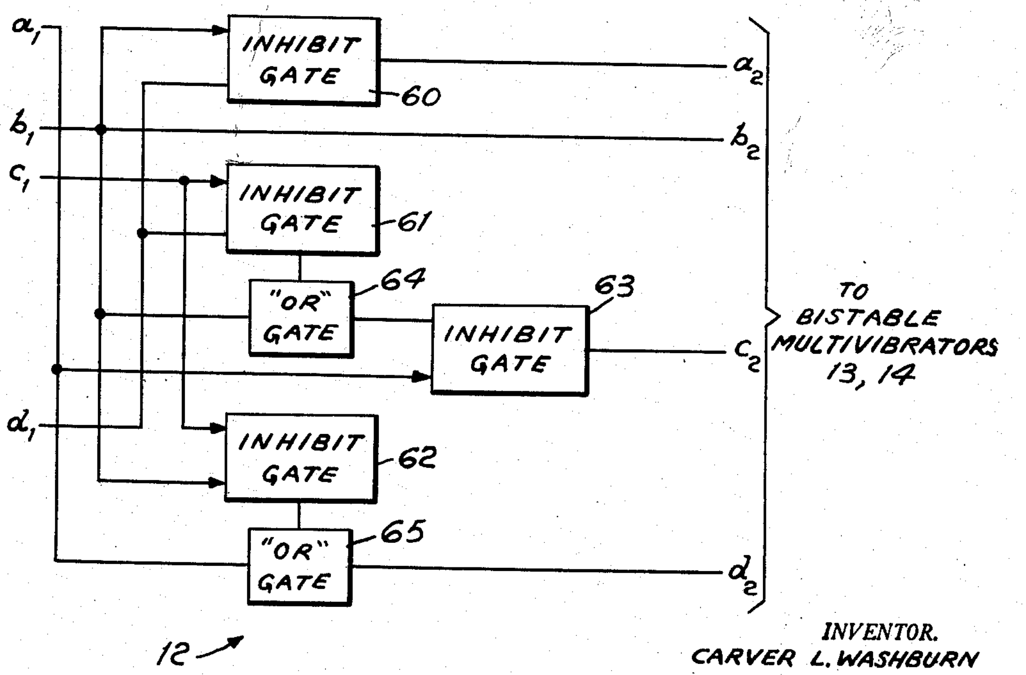
FIG. 5 is a block diagram of the code translator logic circuit of FIG. 1.

A typical code translator 12 is shown in FIG. 5. Its function is to convert the following code:

| $a_1$ | $b_1$ | $c_1$ | $d_1$ | $a_2$ | $b_2$ | $c_2$ | $d_2$ |
|---|---|---|---|---|---|---|---|
| 0 | 0 | 0 | 1 | 1 | 0 | 1 | 0 |
| 0 | 0 | 1 | 1 | 1 | 0 | 0 | 1 |
| 0 | 1 | 1 | 1 | 0 | 1 | 1 | 0 |
| 1 | 1 | 1 | 1 | 0 | 1 | 0 | 1 |

This is accomplished for example, by using four "inhibit" gates 60, 61, 62, 63 and two "or" gates 64, 65. The inhibit gate has two inputs, the inhibit input denoted by the arrow and the signal input. When a pulse is applied to the signal input, a pulse appears at the output only when there is no pulse applied to the inhibit input in coincidence with it.

The "or" gates 64, 65 shown here by way of example have two inputs. If there is a pulse applied to either or both inputs, a pulse will appear at the output.

A more detailed treatment may be found in "Pulse and Digital Circuits," Jacob Millman and H. Taub, McGraw-Hill, 1956.

In the course of pulse amplitude compression, an ambiguity may arise. For the example at hand, FIG. 3 indicates the same output level for four different input levels. For example, an output of 0 db can be realized by a 0, 12, 24 or 36 db input. This ambiguity may be resolved by electrically recording or reading out the code in a readout device 19 shown in FIG. 2, which may be a visual or audible indicator and the like. The output then consists of a coarse determination of an input amplitude level (the digital code, for the example, $a_2$ and $c_2$ or $b_2$ and $d_2$ in FIG. 1), and a vernier that indicates the exact level of the input within a 12 db range as well as faithful reproduction of the input waveform.

It should be apparent to those skilled in the art to which this invention pertains, that the pulse compression system disclosed can use either transistors or vacuum tubes. Also, it should be appreciated that gain devices may be utilized in lieu of step attenuators without departing from the spirit of the invention.

While I have described above the principles of my invention in connection with specific apparatus, it is to be clearly understood that this description is made only by way of example and not as a limitation to the scope of my invention, as set forth in the objects thereof and in the accompanying claims.

I claim:

1. A pulse amplitude compression system compressing pulses having a wide range of amplitude variation into a relatively narrow range of amplitude variation comprising:
- a source of said wide range pulses;
- a plurality of channels coupled to said source equal in number to a predetermined number of segments of said wide range, each of said channels including means responsive to said wide range pulses to provide an output pulse in response to each of said wide range pulses, a different one of said channels providing said output pulse in said narrow range for each of said segments;
- means coupled to said source responsive to each of said wide range pulses to generate a control signal indicative of which of said segments the amplitude of each of said wide range pulses fall; and
- means coupled to said channels and said means to generate responsive to said control signal to select that one channel of said channels providing said output pulse in said narrow range.

2. A system according to claim 1, wherein said means to generate include means means to produce said control signal in the form of a digital code signal.

3. A system according to claim 1, wherein said means to generate includes means to produce said control signal in the form of a digital code signal selected from a group of discrete digital code signals each representing a different one of said segments.

4. A system according to claim 1, wherein said means to select includes
- bistable means coupled to said means to generate and
- a diode matrix coupled between said bistable means and said channels.

5. A system according to claim 1, wherein said means to generate includes
- a means responsive to said wide range pulses to produce a first digital code signal indicative of which of said segments the amplitude of said wide range pulses fall; and

- means responsive to said first code signal to translate said first code signal to a given second digital code signal.

6. A system according to claim 1, including
- a delay network and an amplifier coupled in tandem to couple said source to said channels.

7. A pulse amplitude compression system for compressing pulses having a wide range of amplitude variation into a relatively narrow range of amplitude variation comprising:
- a source of said wide range pulses;
- a plurality of channels coupled to said source equal in number to a predetermined number of segments of said wide range, each of said channels providing an output pulse in response to each of said wide range pulses, a different one of said channels providing said output pulse in said narrow range for each of said segments;
- means coupled to said source responsive to each of said wide range pulses to generate a control signal indicative of which of said segments the amplitude of each of said wide range pulses fall; and
- means coupled to said channels and said means to generate responsive to said control signal to select that one channel of said channels providing said output pulses in said narrow range;
- said means to generate including
  - a means responsive to said wide range pulses to produce a first digital code signal indicative of which of said segments the amplitude of said wide range pulses fall; and
  - means responsive to said first code signal to translate said first code signal to a given second digital code signal; and
- said means to select including
  - bistable means coupled to said means to translate, and a diode matrix coupled between said bistable means and said channels.

References Cited in the file of this patent

UNITED STATES PATENTS

| | | |
|---|---|---|
| 2,612,550 | Jacobi | Sept. 30, 1952 |
| 2,666,098 | Leonard | Jan. 12, 1954 |
| 2,715,181 | Glenn et al. | Aug. 9, 1955 |
| 2,912,684 | Steele | Nov. 10, 1959 |